(12) United States Patent
Zhao et al.

(10) Patent No.: US 12,104,908 B2
(45) Date of Patent: Oct. 1, 2024

(54) ROBUST FILTERING METHOD FOR INTEGRATED NAVIGATION BASED ON STATISTICAL SIMILARITY MEASURE

(71) Applicant: Harbin Engineering University, Harbin (CN)

(72) Inventors: Yuxin Zhao, Harbin (CN); Bo Xu, Harbin (CN); Yu Guo, Harbin (CN); Lei Wu, Harbin (CN); Junmiao Hu, Harbin (CN); Chong Chen, Harbin (CN); Lianzhao Wang, Harbin (CN); Shengxin Li, Harbin (CN); Xiaoyu Wang, Harbin (CN); Zhaoyang Wang, Harbin (CN)

(73) Assignee: Harbin Engineering University, Harbin (CN)

( * ) Notice: Subject to any disclaimer, the term of this patent is extended or adjusted under 35 U.S.C. 154(b) by 279 days.

(21) Appl. No.: 17/843,451

(22) Filed: Jun. 17, 2022

(65) Prior Publication Data
US 2022/0326016 A1    Oct. 13, 2022

Related U.S. Application Data

(63) Continuation of application No. PCT/CN2022/093182, filed on May 17, 2022.

(30) Foreign Application Priority Data

Sep. 23, 2021   (CN) .......................... 202111115235.1

(51) Int. Cl.
   *G01C 21/16*   (2006.01)
(52) U.S. Cl.
   CPC ............................... *G01C 21/1652* (2020.08)

(58) Field of Classification Search
   CPC .................................................. G01C 21/1652
   See application file for complete search history.

(56) References Cited

U.S. PATENT DOCUMENTS

2021/0080287 A1*   3/2021   Xu ..................... G01C 21/183
2022/0404152 A1*   12/2022  Chen ..................... G01C 21/20

FOREIGN PATENT DOCUMENTS

CN   109724599 A      5/2019
CN   112507281 A  *  11/2020   .............. G01C 21/16
   (Continued)

OTHER PUBLICATIONS

CN112507281A—Machine Translation—Zhang et al.—2020 (Year: 2020).*

(Continued)

*Primary Examiner* — Jess Whittington
*Assistant Examiner* — Rami Nabih Bedewi
(74) *Attorney, Agent, or Firm* — IPRO, PLLC (57) ABSTRACT

The disclosure belongs to the technical field of integrated navigation under non-ideal conditions, and in particular relates to a robust filtering method for integrated navigation based on a statistical similarity measure (SSM). In view of the situation that there are normal beam measurement information of the DVL and beam measurement information with a large error simultaneously in a SINS/DVL tightly integrated system, and aiming at the problem that the existing robust filters of an integrated navigation system process the measurement information in a rough manner and are likely to lead to loss of normal measurement information, the disclosure proposes a novel robust filtering method based on decomposition of multi-dimensional measurement equations and the SSM. The disclosure introduces the SSM theory while decomposing the multi-dimensional measurement equations of the SINS/DVL tightly integrated navigation system, and assists the measurement noise variance of (Continued)

each beam to complete respective adaptive update in case of a large measurement error, finally ensuring independence of processing of the measurement information of each beam. The disclosure can be used in the field of integrated navigation of underwater vehicles under non-ideal conditions.

1 Claim, 4 Drawing Sheets

(56) References Cited

FOREIGN PATENT DOCUMENTS

| | | |
|---|---|---|
| CN | 112525218 A | 3/2021 |
| CN | 113819906 A | 12/2021 |
| JP | 2012180024 A | 9/2012 |

OTHER PUBLICATIONS

Xu, Bo et al. "An improved robust Kalman Filter for SINS/DVL tightly integrated navigation system" IEEE Transactions on Instrumentation and measurement. May 12, 2021, V70. p. 2-12.

Huang, Yulong et al. "A novel-outlier-robust Kalman filtering framework based on statistical similarity measure" IEEE Transactions on Instrumentation and measurement. Jun. 30, 2021. V6 (66).

* cited by examiner

ROBUST FILTERING METHOD FOR INTEGRATED NAVIGATION BASED ON STATISTICAL SIMILARITY MEASURE

TECHNICAL FIELD

The disclosure belongs to the technical field of integrated navigation under non-ideal conditions, and in particular relates to a robust filtering method for integrated navigation based on a statistical similarity measure.

BACKGROUND

A Strap-down Inertial Navigation System/Doppler Velocity Log (SINS/DVL) integrated navigation system is one of the most commonly used integrated navigation methods for underwater vehicles. A tight integration mode, which can use the original beam measurement information of a DVL and is good in fault tolerance, is gradually widely used. With the Doppler frequency shift principle, a DVL can measure the speed of a carrier along the direction of a sound wave beam by calculating the difference between the frequency of a sound wave emitted to the bottom and the frequency of the reflected sound wave received. However, in some complex situations, the DVL will have a large measurement error. For example, the sound wave beam emitted by the DVL cannot reach the seabed due to the occlusion of marine life. Or when an underwater vehicle passes through a trench, the distance between the vehicle and the seabed exceeds the range of the sound wave beam of the DVL. Or there is a strong wave absorbing material (such as silt) on the seabed, and the emitted sound wave beam cannot be reflected. Theoretically, when a certain beam of the DVL has a large measurement error, the filtering algorithm of a tight integration system needs to be able to automatically reduce the utilization rate of the error information of the beam. However, most of robust filters used in the current integrated navigation systems uniformly adjust the utilization rate of all measurement information. For a typical multi-dimensional measurement system such as a SINS/DVL tight integrated navigation system, reducing the utilization rate of beam information with a single large measurement error may cause other normal beam measurement information to be underutilized in the system, thus losing useful information.

Therefore, there is a need to invent a robust filtering method that reduces the influence of beam information with a large measurement error without affecting the navigation system's utilization of normal beam information.

SUMMARY

The objective of the disclosure is to provide a robust filtering method for integrated navigation based on a statistical similarity measure (SSM).

The objective of the disclosure is achieved through the following technical solution, including the following steps:

step 1: defining coordinate systems, including the following steps:

defining that a body coordinate system is represented by b, an "Earth-centered, Earth-fixed" coordinate system is represented by e, an "East-North-Up" geographic coordinate system is represented by n as a navigation system, an inertial coordinate system is represented by i, and a DVL coordinate system is represented by d;

defining velocities in different coordinate systems:

$$V_{SINS}{}^b = [V_x{}^b V_y{}^b V_z{}^b]^T$$

$$V_{SINS}{}^n = [V_{SINS\_E}{}^n V_{SINS\_N}{}^n V_{SINS\_U}{}^n]^T$$

$$V_{SINS}{}^d = [V_{SINS\_1}{}^d V_{SINS\_2}{}^d V_{SINS\_3}{}^d V_{SINS\_4}{}^d]^T$$

$$V_{DVL}{}^d = [V_{DVL\_1}{}^d V_{DVL\_2}{}^d V_{DVL\_3}{}^d V_{DVL\_4}{}^d]^T$$

where $V_{SINS}{}^b$ represents a velocity vector of a strap-down inertial navigation system in the b-frame; $V_{SINS}{}^n$ represents a velocity vector of the strap-down inertial navigation system in the n-frame; $V_{SINS}{}^d$ represents a velocity vector of the strap-down inertial navigation system in the d-frame; and $V_{DVL}{}^d$ represents a velocity vector of a beam of the DVL in the d-frame;

step 2: establishing state equations of a SINS/DVL tightly integrated navigation system, including the following steps:

selecting errors of the SINS as the states, including a misalignment angle $\phi$, a velocity error $\delta V^n$, a position error $\delta p$, a gyro constant drift $\varepsilon^b$ and an accelerometer constant zero bias $\nabla^b$, and establishing state equations as follows:

$$X = [\delta p^T \delta V^{nT} \phi^T \varepsilon^{bT} \nabla^{bT}]^T$$

$$\dot{X} = FX + Gw$$

$$w = [w^{bg} \; w^{ba}]^T$$

$$\delta \omega_{ib}^b = \varepsilon^b + w^{bg}$$

$$\delta f^b = \nabla^b + w^{ba}$$

$$\dot{\phi} = -\omega_{in}^n \times \phi + \delta \omega_{in}^n - C_b^n \delta \omega_{ib}^b$$

$$\delta \dot{v}^n = f^b \times \phi + v^n \times (\delta \omega_{ie}^n + \delta \omega_{in}^n) - (\delta \omega_{ie}^n + \delta \omega_{in}^n) \times \delta v^n + C_b^n \delta f^b + \delta g^n$$

$$\delta \dot{p} = M_{pv} \delta v^n + M_{pp} \delta p$$

$$M_{pv} = \begin{bmatrix} 0 & \dfrac{1}{R_M} & 0 \\ \dfrac{\sec L}{R_N} & 0 & 0 \\ 0 & 0 & 1 \end{bmatrix}$$

$$M_{pp} = \begin{bmatrix} 0 & 0 & -\dfrac{v_N}{(R_M)^2} \\ \dfrac{v_E \sec L \tan L}{R_N} & 0 & -\dfrac{v_E \sec L}{(R_N)^2} \\ 0 & 0 & 0 \end{bmatrix}$$

where $\varepsilon^b$ represents a gyro constant drift vector; $w^{bg}$ is a gyro random drift vector; $\nabla^b$ is an accelerometer constant zero bias vector; $w^{ba}$ is an accelerometer random zero bias vector; $\phi$ represents a misalignment angle vector consisting of pitch, roll and yaw misalignment angles; $C_b^n$ is a direction cosine matrix, representing a transformation from the b-frame to the n-frame; $\omega_{in}^n$ represents an angular velocity vector in the b-frame relative to the i-frame under the b-frame, and a corresponding calculation error is $\delta \omega_{in}^n = \delta \omega_{ie}^n + \delta \omega_{en}^n$; $v^n = [v_E v_N v_h]^T$ is a velocity vector of a body relative to the ground in the n-frame, and a corresponding error vector is $\delta v^n$; $f^b$ is an output of an accelerometer; $\delta g^n$ is a projection of a gravity error vector in the n-frame; $\delta p$ represents a position error vector consisting of a latitude error $\delta L$, a longitude error $\delta \lambda$ and an altitude error $\delta h$ ; and $R_M$ and $R_N$ respectively represent the radius of curvature of a meridian circle and a prime vertical circle;

step 3: establishing and decomposing measurement equations of the SINS/DVL tightly integrated navigation system, including the following steps:

measurement equations:

$$Z = \left[\hat{V}_{SINS}^d - \hat{V}_{DVL}^d\right]$$
$$= \left[C_b^d C_n^b (I_{3\times 3} + \phi \times)(V_{INS}^n + \delta V^n) - (V_{DVL}^d + \delta V_{DVL}^d)\right]$$
$$= \left[C_b^d C_n^b \delta V^n - C_b^d C_n^b V_{INS}^n \times \phi - \delta V_{DVL}^d\right]$$
$$Z = HX + v$$
$$H = \left[0_{4\times 3} \, C_b^d C_n^b \, -C_b^d C_n^b V_{SINS}^n \times 0_{4\times 3} \, 0_{4\times 3}\right]$$

where $v = -\delta V_{DVL}^D$ represents a measurement noise; $I_{3\times 3}$ is a three-dimensional identity matrix; [×x] represents a cross product of vectors; $V_{DVL}^d = V_{SINS}^d = C_b^d C_n^b V_{SINS}^n$; $C_b^d = [b_1 b_2 b_3 b_4]^T$;

$$b_i = \begin{bmatrix} \sin\varphi_i \cos\alpha \\ \cos\varphi_i \cos\alpha \\ -\sin\alpha \end{bmatrix};$$

$$\varphi_i = (i-1)90° + \varphi_0, \, i = 1, 2, 3, 4;$$

α is a horizontal angle between the beam and the carrier; and $\varphi_0$ is set as 0° or 45°;

measurement noises of various beams of the DVL are usually uncorrelated, and a measurement noise covariance matrix $R = E[vv^T]$ is a diagonal matrix, so the measurement equation is equivalently decomposed:

$$\begin{cases} Z^1 = \hat{V}_{INS\_1}^d - \hat{V}_{DVL\_1}^d = H^1 X + v^1 \\ Z^2 = \hat{V}_{INS\_2}^d - \hat{V}_{DVL\_2}^d = H^2 X + v^2 \\ Z^3 = \hat{V}_{INS\_3}^d - \hat{V}_{DVL\_3}^d = H^3 X + v^3 \\ Z^4 = \hat{V}_{INS\_4}^d - \hat{V}_{DVL\_4}^d = H^4 X + v^4 \\ Z^5 = \hat{h}_{PS} - h_{INS} = H^5 X + v^5 \end{cases}$$

where $H^j$ represents the j-th row of a measurement matrix; $v^j$ is the corresponding measurement noise, and the measurement noises of different beams of the DVL are uncorrelated; here, the measured values of four beams of the DVL are assumed to be measured respectively by different sensors;

step 4: establishing a cost function of state estimation based on an SSM:

$$(\hat{X}_{k+1/k+1}, \hat{P}_{k+1/k+1}) =$$

$$\operatorname*{argmax}_{(X_{k+1}, P_{k+1})} \left\{ f_x\!\left(tr\!\left(A_{k+1}\hat{P}_{k+1/k}^{-1}\right)\right) + \sum_{j=1}^{q} f_z\!\left(tr\!\left(B_{k+1}^j(R_{k+1}^j)^{-1}\right)\right) \right\} =$$

$$\operatorname*{argmax}_{(X_{k+1}, P_{k+1})} J(X_{k+1}, P_{k+1})$$

$$A_{k+1} = \int (X - \hat{X}_{k+1/k})(X - \hat{X}_{k+1/k})^T N(X; X_{k+1}, P_{k+1}) dX =$$

$$(X_{k+1} - \hat{X}_{k+1/k})(X_{k+1} - \hat{X}_{k+1/k})^T + P_{k+1}$$

$$B_{k+1}^j = \int (Z_{k+1}^j - h_{k+1}^j(X))(Z_{k+1}^j - h_{k+1}^j(X))^T N(X; X_{k+1}, P_{k+1}) dX$$

where $\hat{X}_{k+1/k}$ and $\hat{P}_{k+1/k}$ respectively represent a state one-step prediction result and a one-step prediction covariance matrix; $N(X; X_{k+1}, P_{k+1})$ represents a Gaussian distribution about X, a mean is $X_{k+1}$, a variance is $P_{k+1}$; a similarity function $f_x(t)$ is selected as $f_x(t) = -0.5t$; a similarity function $f_z(t)$ is selected as $f_z(t) = -\sqrt{(\omega+m)(\omega+t)}$, $\omega$ is the dof parameter, m is the dimension of measurement, m=1; and q=4;

step 5: applying Gauss-Newton iteration to find an optimal value of the cost function, including the following steps:

step 5.1: initializing the number of iterations t=0, setting an initial value of iteration as $\hat{X}_{k+1/k+1}^0 = \hat{X}_{k+1/k}$, and $\hat{P}_{k+1/k+1}^0 = \hat{P}_{k+1/k}$;

step 5.2: calculating a filter gain $K_{k+1}^{j(t)}$;

$$K_{k+1}^{j(t)} = \left(\xi_{k+1}^t \hat{P}_{k+1/k}^{-1} + \sum_{i=1}^{q} \gamma_{k+1}^{i(t)} (H_{k+1}^i)^T (R_{k+1}^i)^{-1} H_{k+1}^i\right)^{-1} \gamma_{k+1}^{j(t)} (H_{k+1}^j)^T (R_{k+1}^j)^{-1}$$

where $$H_{k+1}^j = \left.\frac{\partial h_{k+1}^j(X_{k+1})}{\partial X_{k+1}}\right|_{X_{k+1}=\hat{X}_{k+1/k+1}^t};$$

$\zeta_{k+1}^t$ and $\gamma_{k+1}^{i(t)}$ are equivalent to auxiliary parameters used for adjusting the one-step prediction covariance matrix and a measurement noise variance;

step 5.3: calculating a posterior state $\hat{X}_{k+1/k+1}^{t+1}$:

$$\hat{X}_{k+1/k+1}^{t+1} =$$

$$\hat{X}_{k+1/k} + \sum_{j=1}^{q} K_{k+1}^{j(t)} \left(Z_{k+1}^j - h_{k+1}^j(\hat{X}_{k+1/k+1}^t) - H_{k+1}^j\left(\hat{X}_{k+1/k}^t - \hat{X}_{k+1/k+1}^t\right)\right)$$

step 5.4: calculating an estimated error covariance matrix $\hat{P}_{k+1/k+1}^t$:

$$\hat{P}_{k+1/k+1}^t =$$

$$\left(I - \sum_{j=1}^{q} K_{k+1}^{j(t)} H_{k+1}^j\right) \hat{P}_{k+1/k} \left(I - \sum_{j=1}^{q} K_{k+1}^{j(t)} H_{k+1}^j\right)^T + \sum_{j=1}^{q} K_{k+1}^{j(t)} R_{k+1}^j (K_{k+1}^{j(t)})^T$$

and step 5.5: judging whether $$\left.\frac{\partial J(X_{k+1}, P_{k+1})}{\partial X_{k+1}}\right|_{X_{k+1}=\hat{X}_{k+1/k+1}^t, P_{k+1}=\hat{P}_{k+1/k+1}^t} = 0$$

is met; if not, setting t=t+1, returning to step 5.2; otherwise, setting $X_{k+1} = \hat{X}_{k+1/k+1}^t$, $P_{k+1} = \hat{P}_{k+1/k+1}^t$, and outputting an error X of the SINS; and step 6: feeding back the estimated error X of the SINS to the SINS for correction, including the following steps:

according to the estimated error X of the SINS, obtaining the misalignment angle $\phi$, the velocity error $\delta V^n$, and the position error $\delta p$, wherein for an attitude matrix $C_b^{n'}$, a velocity $\hat{V}^n$, and a position $\hat{p}$ solved by the SINS, a feedback correction method of attitude errors is:

$$C_b^n = (1+\phi \times) C_b^{n'}; \text{ and}$$

subtracting the velocity error $\delta V^n$ and the position error $\delta p$ directly from the output of the SINS:

$$V^n = \hat{V}^n - \delta V^n, \quad p = \hat{p} - \delta p.$$

Beneficial effects of the disclosure:

In view of the situation that there are normal beam measurement information of the DVL and beam measurement information with a large error simultaneously in an SINS/DVL tightly integrated system, and aiming at the problem that the existing robust filters of an integrated navigation system process the measurement information in a rough manner and are likely to lead to loss of normal measurement information, the disclosure proposes a novel robust filtering method based on decomposition of multi-dimensional measurement equations and the SSM. The disclosure introduces the SSM theory while decomposing the multi-dimensional measurement equations of the SINS/DVL tightly integrated navigation system, and assists the measurement noise variance of each beam to complete respective adaptive update in case of a large measurement error, finally ensuring independence of processing of the measurement information of each beam. The disclosure can be used in the field of integrated navigation of underwater vehicles under non-ideal conditions.

DETAILED DESCRIPTION

The disclosure is further described below with reference to the accompanying drawings.

The objective of the disclosure is to provide a robust filtering method for individually adjusting the measurement noise variance of each beam of the DVL for a SINS/DVL tightly integrated navigation system. That is, when a certain measurement has a large error, the corresponding measurement noise variance matrix in a filter can be automatically increased, while the measurement noise variance matrices of other normal measurements are hardly adjusted.

Step 1: Establishment of a SINS/DVL tightly integrated navigation system model

First, common coordinate systems are defined. A body coordinate system is represented by b. An "Earth-centered, Earth-fixed" coordinate system is represented by e. An "East-North-Up" geographic coordinate system is represented by n as a navigation system. An inertial coordinate system is represented by i. A DVL coordinate system is represented by d.

Figure 1:
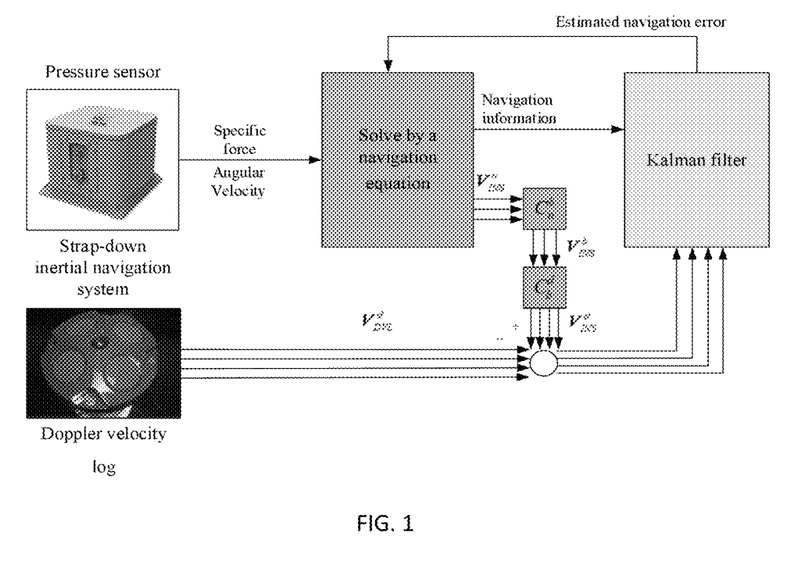
FIG. 1 is a structure diagram of the SINS/DVL tightly integrated navigation system.

FIG. 1 depicts the structure of the SINS/DVL tightly integrated navigation system. The SINS, as a main navigation device, provides velocity, attitude and position information. The DVL, as a navigation aid, provides four-dimensional measurement vectors, that is, the velocities of the DVL relative to the seabed in four beam directions. A SINS solution is transformed into a difference between the velocity in the d-frame and the velocity of a beam of the DVL as the observation of a navigation filter. Then the state is estimated and fed back to the SINS to reduce the navigation error of the SINS.

In the disclosure, it is assumed that an installing angle error between the SINS and the DVL and the scale factor of the DVL have been calibrated and compensated after the device is installed. Residual installing angle errors and scale factor errors are negligible. Therefore, the disclosure only selects the errors of the SINS as the states, including a misalignment angle $\phi$, a velocity error $\delta V^n$, a position error $\delta p$, a gyro constant drift $\varepsilon^b$ and an accelerometer constant zero bias $\nabla^b$. The state equations are as follows:

$$X = [\delta p^T \ \delta V^{nT} \ \phi^T \ \varepsilon^{bT} \ \nabla^{bT}]^T \quad (1)$$

$$\dot{X} = FX + Gw \quad (2)$$

$$w = [w^{bg} \ w^{ba}]^T \quad (3)$$

$$\delta \omega_{ib}^b = \varepsilon^b + w^{bg} \quad (4)$$

$$\delta f^b = \nabla^b + w^{ba} \quad (5)$$

$$\dot{\phi} = -\omega_{in}^n \times \phi + \delta\omega_{in}^n - C_b^n \delta\omega_{ib}^b \quad (6)$$

$$\delta \dot{v}^n = f^b \times \phi + v^n \times (\delta\omega_{ie}^n + \delta\omega_{in}^n) - (\delta\omega_{ie}^n + \delta\omega_{in}^n) \times \delta v^n + C_b^n \delta f^b + \delta g^n \quad (7)$$

$$\delta \dot{p} = M_{pv} \delta v^n + M_{pp} \delta p \quad (8)$$

$$M_{pv} = \begin{bmatrix} 0 & \dfrac{1}{R_M} & 0 \\ \dfrac{\sec L}{R_N} & 0 & 0 \\ 0 & 0 & 1 \end{bmatrix} \quad (9)$$

$$M_{pp} = \begin{bmatrix} 0 & 0 & -\dfrac{v_N}{(R_M)^2} \\ \dfrac{v_E \sec L \tan L}{R_N} & 0 & -\dfrac{v_E \sec L}{(R_N)^2} \\ 0 & 0 & 0 \end{bmatrix} \quad (10)$$

where $\varepsilon^b$ represents a gyro constant drift vector, and $w^{bg}$ is a gyro random drift vector. $\nabla^b$ is an accelerometer constant zero bias vector. $w^{ba}$ is an accelerometer random zero bias vector. $\phi$ represents a misalignment angle vector consisting of pitch, roll and yaw misalignment angles. $C_b^n$ is a direction cosine matrix, representing a transformation from the b-frame to the n-frame. $\omega_{in}^n$ represents an angular velocity vector in the b-frame relative to the iframe under the b-frame, and a corresponding calculation error is $\delta\omega_{in}^n = \delta\omega_{ie}^n + \delta\omega_{en}^n$. $v^n = [v_E v_N v_h]^T$ is a velocity vector of a body relative to the ground in the n-frame, and the corresponding error vector is $\delta v^n$. $f^b$ is an output of an accelerometer. $\delta g^n$ is a projection of a gravity error vector in the n-frame. $\delta p$ represents a position error vector consisting of a latitude error $\delta L$, a longitude error $\delta\lambda$ and an altitude error $\delta h$. $R_M$ and $R_N$ respectively represent the radius of curvature of a meridian circle and a prime vertical circle.

Figure 2:
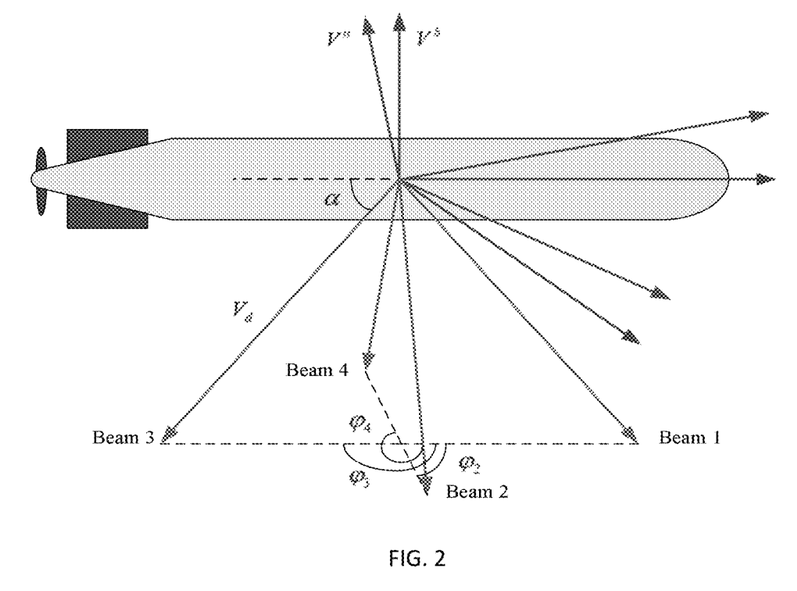
FIG. 2 is a diagram showing a velocity relationship in different coordinate systems.

Before introducing measurement equations, the disclosure defines the velocities in different coordinate systems, taking a four-beam configuration DVL as an example, as shown in FIG. 2. $V_{SINS}^b$ is a velocity vector of a strap-down inertial navigation system in the b-frame. $V_{SINS}^n$ represents a velocity vector of the strap-down inertial navigation system in the n-frame. $V_{SINS}^d$ represents a velocity vector of the strap-down inertial navigation system in the d-frame. $V_{DVL}{}^d$ represents a velocity vector of a beam of the DVL in the d-frame.

$$V_{SINS}{}^b = [V_x{}^b \ V_y{}^b \ V_z{}^b]^T \quad (11)$$

$$V_{SINS}{}^n = [V_{SINS\_E}{}^n \ V_{SINS\_N}{}^n \ V_{SINS\_U}{}^n]^T \quad (12)$$

$$V_{SINS}{}^d = [V_{SINS\_1}{}^d \ V_{SINS\_2}{}^d \ V_{SINS\_3}{}^d \ V_{SINS\_4}{}^d]^T \quad (13)$$

$$V_{DVL}{}^d = [V_{DVL\_1}{}^d \ V_{DVL\_2}{}^d \ V_{DVL\_3}{}^d \ V_{DVL\_4}{}^d]^T \quad (14)$$

The relationship between the velocity of the strap-down inertial navigation system in the navigation frame and the beam velocity of the DVL in the d-frame is as follows:

$$V_{DVL}^d = V_{SINS}^d = C_b^d C_n^b V_{SINS}^n \quad (15)$$

$$C_b^d = [b_1 \ b_2 \ b_3 \ b_4]^T \quad (16)$$

$$b_i = \begin{bmatrix} \sin\varphi_i \cos\alpha \\ \cos\varphi_i \cos\alpha \\ -\sin\alpha \end{bmatrix} \quad (17)$$

$$\varphi_i = (i-1)90° + \varphi_0, \ i = 1, 2, 3, 4 \quad (18)$$

where $\alpha$ is a horizontal angle between the beam and the carrier. Generally, $\varphi_0$ is set as 0° or 45°.

The measured value of a beam of the DVL is modeled as follows:

$$\hat{V}_{DVL}{}^d = V_{DVL}{}^d + \delta V_{DVL}{}^d \quad (19)$$

where $\delta V_{DVL}{}^d$ represents a measurement noise of the DVL. The result of converting the velocity output of the strap-down inertial navigation system to the d-frame is:

$$\hat{V}_{SINS}{}^d = C_b^d C_n^b \hat{V}_{SINS}{}^n = C_b^d C_n^b (I_{3\times3} + \phi\times)(V_{SINS}{}^n + \delta V^n) \quad (20)$$

where $I_{3\times3}$ is a three-dimensional identity matrix. [•×] represents a cross product of vectors.

Simultaneous equations (19) and (20) can obtain measurement equations:

$$Z = [\hat{V}_{SINS}^d - \hat{V}_{DVL}^d] \quad (21)$$
$$= [C_b^d C_n^b (I_{3\times3} + \phi\times)(V_{INS}^n + \delta V^n) - (V_{DVL}^d + \delta V_{DVL}^d)]$$
$$= [C_b^d C_n^b \delta V^n - C_b^d C_n^b V_{INS}^n \times \phi - \delta V_{DVL}^d]$$

$$Z = HX + v \quad (22)$$

$$H = [0_{4\times3} \ C_b^d C_n^b \ -C_b^d C_n^b V_{SINS}^n \times \ 0_{4\times3} \ 0_{4\times3}] \quad (23)$$

where $v = -\delta V_{DVL}{}^d$ represents the measurement noise.

Step 2: Decomposition of multi-dimensional measurement equations of the SINS/DVL tightly integrated navigation system The measurement noises of beams of the DVL are usually uncorrelated, and a measurement noise covariance matrix $R = E[vv^T]$ is a diagonal matrix, so in the disclosure, the measurement equation (22) can be equivalently decomposed:

$$\begin{cases} Z^1 = \hat{V}_{INS\_1}^d - \hat{V}_{DVL\_1}^d = H^1 X + v^1 \\ Z^2 = \hat{V}_{INS\_2}^d - \hat{V}_{DVL\_2}^d = H^2 X + v^2 \\ Z^3 = \hat{V}_{INS\_3}^d - \hat{V}_{DVL\_3}^d = H^3 X + v^3 \\ Z^4 = \hat{V}_{INS\_4}^d - \hat{V}_{DVL\_4}^d = H^4 X + v^4 \\ Z^5 = \hat{h}_{PS} - h_{INS} = H^5 X + v^5 \end{cases} \quad (24)$$

where $H^j$ represents the j-th row of a measurement matrix. $v^j$ is the corresponding measurement noise, and the measurement noises of different beams of the DVL are uncorrelated. Here, the measured values of four beams of the DVL are assumed to be measured respectively by different sensors.

Step 3: Introduction of the concept of statistical similarity measure, and establishment of a cost function of state estimation based on the statistical similarity measure Step 3.1: Introduction of the statistical similarity measure (SSM)

A statistical similarity measure (SSM)$^{s(a,b)}$ may be used to represent the similarity between two random vectors a and b, defined as follows:

$$s(a,b) = E[f(\|a-b\|^2)] = \iint f(\|a-b\|^2) p(a,b) \, da \, db \text{ tm} \quad (25)$$

where $\|\cdot\|$ represents a Euclidean norm, $p(a,b)$ represents a joint probability density between the random vectors a and b. $f(\cdot)$ represents a similarity function and satisfies the following three conditions.

a) $f(\cdot)$ is a continuous function in a domain of definition $[0, +\infty)$.
b) $f(\cdot)$ is a monotonically decreasing function, i.e. $\dot{f}(\cdot) < 0$.
c) The second derivative of $f(\cdot)$ is non-negative, i.e. $\ddot{f}(\cdot) \geq 0$.

A statistical similarity measure conforms to a usual definition of a similarity measure. The higher the similarity between random vectors, the larger the statistical similarity measure. When $f(t)$ is selected as $f(t) = -t$, the SSM represents a negative mean squared error between different random vectors. When $f(t)$ is selected as $$f(t) = \exp\left(-\frac{t}{2\sigma^2}\right),$$

the SSM represents a correlation entropy between different random vectors. By selecting different similarity functions, different SSMs can be implemented.

Step 3.2: Establishment of a robust cost function
First, a system model is assumed as $$X_{k+1} = f_k(X_k) + n_k \quad (26)$$

$$Z_{k+1}{}^j = h_{k+1}{}^j(X_{k+1}) + v_{k+1}{}^j, \ j = 1, 2, \ldots, q \quad (27)$$

where k represents time, $X_{k+1}$ represents a p-dimensional state. $Z_{k+1}{}^j$ represents the j-th measurement. $f_k(\cdot)$ and $h_{k+1}{}^j(\cdot)$ represent a state transition function and a measurement function. $n_k$ and $v_{k+1}{}^j$ represent a process noise and a measurement noise. $Q_k$ and $R_k{}^j$ represent a nominal covariance matrix of the process noise and a nominal covariance matrix of the j-th measurement noise. For the SINS/DVL tight integrated navigation system introduced in the disclosure, q is 4.

The standard Kalman filter (KF) is essentially a weighting of state prediction and measurement information to obtain an optimal estimate of the state, and its weighted least squares cost function reflects the mean squared error between the state and the predicted state, and between the measurement and the predicted measurement. The disclosure establishes a cost function for reflecting the SSM between the state and the predicted state, and between the measurement and the predicted measurement.

$$Q(X_{k+1}) = \underset{q(X_{k+1})}{\operatorname{argmax}} \qquad (28)$$

$$\left\{ s\left(S_{\hat{P}_{k+1/k}}^{-1} X_{k+1}, S_{\hat{P}_{k+1/k}}^{-1} \hat{X}_{k+1/k}\right) + \sum_{j=1}^{q} s\left(S_{R_{k+1}^j}^{-1} Z_{k+1}^j, S_{R_{k+1}^j}^{-1} h_{k+1}^j(X_{k+1})\right) \right\} =$$

$$\underset{q(X_{k+1})}{\operatorname{argmax}} \left\{ \int f_x\left(\left\|S_{\hat{P}_{k+1/k}}^{-1}\left(X_{k+1} - \hat{X}_{k+1/k}\right)\right\|^2\right) q(X_{k+1}) dX_{k+1} + \right.$$

-continued $$\left. \sum_{j=1}^{q} \int f_z\left(\left\|S_{R_{k+1}^j}^{-1}\left(Z_{k+1}^j - h_{k+1}^j(X_{k+1})\right)\right\|^2\right) q(X_{k+1}) dX_{k+1} \right\}$$

where $\hat{X}_{k+1/k}$ and $\hat{P}_{k+1/k}$ represent a state one-step prediction result and a one-step prediction covariance matrix. $S_{R_{k+1}}^j$ and $S_{\hat{P}_{k+1/k}}$ represent root mean square decomposition of the measurement noise variance $R_k^j$ and the one-step prediction covariance matrix $\hat{P}_{k+1/k}$.

For solving the cost function shown in (28), a posterior distribution is approximated as a Gaussian distribution and a lower bound of the cost function in the above equation is solved by using Jensen inequality, which is used as a new cost function.

$$(\hat{X}_{k+1/k+1}, \hat{P}_{k+1/k+1}) = \qquad (29)$$

$$\underset{(X_{k+1}, P_{k+1})}{\operatorname{argmax}} \left\{ f_x\left(tr\left(A_{k+1} \hat{P}_{k+1/k}^{-1}\right)\right) + \sum_{j=1}^{q} f_z\left(tr\left(B_{k+1}^j (R_{k+1}^j)^{-1}\right)\right) \right\} =$$

$$\underset{(X_{k+1}, P_{k+1})}{\operatorname{argmax}} J(X_{k+1}, P_{k+1})$$

$$A_{k+1} = \int (X - \hat{X}_{k+1/k})(X - \hat{X}_{k+1/k})^T N(X; X_{k+1}, P_{k+1}) dX = \qquad (30)$$

$$(X_{k+1} - \hat{X}_{k+1/k})(X_{k+1} - \hat{X}_{k+1/k})^T + P_{k+1}$$

$$B_{k+1}^j = \int (Z_{k+1}^j - h_{k+1}^j(X))(Z_{k+1}^j - h_{k+1}^j(X))^T N(X; X_{k+1}, P_{k+1}) dX \qquad (31)$$

where $N(X; X_{k+1}, P_{k+1})$ represents a Gaussian distribution about X, a mean is $X_{k+1}$, and a variance is $P_{k+1}$.

When the measurement equation $h_{k+1}^j(\cdot)$ is nonlinear, Sigma point transformation, such as an unscented transformation rule or a third-degree spherical-radial cubature rule, may be used to approximate the solution. When the measurement equation is linear, (31) may be written as $$B_{k+1}^j = (Z_{k+1}^j - H_{k+1}^j X_{k+1})(Z_{k+1}^j - H_{k+1}^j X_{k+1})^T + H_{k+1}^j P_{k+1}(H_{k+1}^j)^T \qquad (32).$$

Step 4: Application of Gauss-Newton iteration to find the optimal value of the cost function To solve the extremum of the cost function, in general, the method of taking the derivative of the cost function and setting the derivative to zero can be used for calculation.

$$\left. \frac{\partial J(X_{k+1}, P_{k+1})}{\partial X_{k+1}} \right|_{X_{k+1} = \hat{X}_{k+1/k+1}, P_{k+1} = \hat{P}_{k+1/k+1}} = 0 \qquad (33)$$

Since equation (33) is a nonlinear equation, (33) is solved by the Gauss-Newton iteration method in the disclosure.

According to the Gauss-Newton iteration method, for the nonlinear equation (33), the numerical update process of the solution is:

$$\hat{X}_{k+1/k+1}^{t+1} = \hat{X}_{k+1/k+1}^t - \tilde{\Theta}^{-1}\left(\hat{X}_{k+1/k+1}^t, \hat{P}_{k+1/k+1}^t\right) \left. \frac{\partial J(X_{k+1}, P_{k+1})}{\partial X_{k+1}} \right|_{X_{k+1} = \hat{X}_{k+1/k+1}^t, P_{k+1} = \hat{P}_{k+1/k+1}^t} \qquad (34)$$

where the superscript t denotes the t-th iteration. An initial value of iteration is set to $\hat{X}_{k+1/k+1}^0 = \hat{X}_{k+1/k}$, $\hat{P}_{k+1/k+1}^0 = \hat{P}_{k+1/k}$. $\tilde{\Theta}(\hat{X}_{k+1/k+1}^t, \hat{P}_{k+1/k+1}^t)$ represents an approximate Hessian matrix of the cost function $J(X_{k+1}, P_{k+1})$.

$$\left. \frac{\partial J(X_{k+1}, P_{k+1})}{\partial X_{k+1}} \right|_{X_{k+1} = \hat{X}_{k+1/k+1}, P_{k+1} = \hat{P}_{k+1/k+1}} = \qquad (35)$$

$$-\xi_{k+1}^t \hat{P}_{k+1/k}^{-1}\left(\hat{X}_{k+1/k+1}^t, \hat{X}_{k+1/k}\right) +$$

$$\sum_{j=1}^{q} \gamma_{k+1}^{j(t)} (H_{k+1}^j)^T (R_{k+1}^j)^{-1} \left(Z_{k+1}^j - h_{k+1}^j(\hat{X}_{k+1/k+1}^t)\right)$$

$$\tilde{\Theta}\left(\hat{X}_{k+1/k+1}^t, \hat{P}_{k+1/k+1}^t\right) = -\xi_{k+1}^t \hat{P}_{k+1/k}^{-1} - \sum_{j=1}^{q} \gamma_{k+1}^{j(t)} (H_{k+1}^j)^T (R_{k+1}^j)^{-1} H_{k+1}^j \qquad (36)$$

where $$H_{k+1}^j = \left. \frac{\partial h_{k+1}^j(X_{k+1})}{\partial X_{k+1}} \right|_{X_{k+1} = \hat{X}_{k+1/k+1}^t} \qquad (37)$$

$$\begin{cases} \xi_{k+1}^t = -2\dot{f}_x\left(tr\left(A_{k+1}^* \hat{P}_{k+1/k}^1\right)\right) \\ \gamma_{k+1}^{j(t)} = -2\dot{f}_z\left(tr\left(B_{k+1}^{j(*)} (R_{k+1}^j)^{-1}\right)\right) \end{cases}$$

$$A_{k+1}^* = \hat{P}_{k+1/k+1}^t + \left(\hat{X}_{k+1/k+1}^{t+1} - \hat{X}_{k+1/k}\right)\left(\hat{X}_{k+1/k+1}^{t+1} - \hat{X}_{k+1/k}\right)^T \qquad (38)$$

$$B_{k+1}^{j(*)} = \qquad (39)$$

$$\int (Z_{k+1}^j - h_{k+1}^j(X))(Z_{k+1}^j - h_{k+1}^j(X))^T N\left(X; \hat{X}_{k+1/k+1}^{t+1}, \hat{P}_{k+1/k+1}^t\right) dX$$

Sorted out:

$$\hat{X}_{k+1/k+1}^{t+1} = \qquad (40)$$

$$\hat{X}_{k+1/k} + \left(\xi_{k+1}^t \hat{P}_{k+1/k}^1 + \sum_{j=1}^{q} \gamma_{k+1}^{j(t)} (H_{k+1}^j)^T (R_{k+1}^j)^{-1} H_{k+1}^j\right)^{-1} \sum_{j=1}^{q} \gamma_{k+1}^{j(t)} (H_{k+1}^j)^T$$

$$(R_{k+1}^j)^{-1} \left(Z_{k+1}^j - h_{k+1}^j(\hat{X}_{k+1/k+1}^t)\right) - H_{k+1}^j\left(\hat{X}_{k+1/k} - \hat{X}_{k+1/k+1}^{t+1}\right) =$$

$$\hat{X}_{k+1/k} + \sum_{j=1}^{q} K_{k+1}^{j(t)} \left(Z_{k+1}^j - h_{k+1}^j(\hat{X}_{k+1/k+1}^t) - H_{k+1}^j\left(\hat{X}_{k+1/k} - \hat{X}_{k+1/k+1}^{t+1}\right)\right)$$

In the above equation, the filter gain is:

$$K_{k+1}^{j(t)} = \left(\xi_{k+1}^t \hat{P}_{k+1/k}^1 + \sum_{i=1}^{q} \gamma_{k+1}^{i(t)}(H_{k+1}^i)^T (R_{k+1}^i)^{-1} H_{k+1}^i \right)^{-1} \gamma_{k+1}^{j(t)}(H_{k+1}^j)^T (R_{k+1}^j)^{-1} \quad (41)$$

where $\xi_{k+1}^t$ and $\gamma_{k+1}^{i(t)}$ are equivalent to auxiliary parameters used for adjusting the one-step prediction covariance matrix and the measurement noise variance.

The estimated error is:

$$\delta X_{k+1}^t = X_{k+1} - \hat{X}_{k+1/k+1}^t = X_{k+1} - \hat{X}_{k+1/k} - \sum_{j=1}^{q} K_{k+1}^{j(t)} \left( Z_{k+1}^j - h_{k+1}^j(\hat{X}_{k+1/k+1}^t) - H_{k+1}^j \left( \hat{X}_{k+1/k} - \hat{X}_{k+1/k+1}^t \right) \right) \approx \left( I - \sum_{j=1}^{q} K_{k+1}^{j(t)} H_{k+1}^j \right) (X_{k+1} - \hat{X}_{k+1/k}) - \sum_{j=1}^{q} K_{k+1}^{j(t)} v_{k+1}^j. \quad (42)$$

From this, the estimated error covariance matrix can be directly obtained:

$$\hat{P}_{k+1/k+1}^t = E[\delta X_{k+1}^t \delta X_{k+1}^{tT}] = \left( I - \sum_{j=1}^{q} K_{k+1}^{j(t)} H_{k+1}^j \right) \hat{P}_{k+1/k} \left( I - \sum_{j=1}^{q} K_{k+1}^{j(t)} H_{k+1}^j \right)^T + \sum_{j=1}^{q} K_{k+1}^{j(t)} R_{k+1}^j (K_{k+1}^{j(t)})^T. \quad (43)$$

Typically, for a SINS/DVL tight integrated navigation system, the process noise caused by random drift of a gyro and an accelerometer is a Gaussian noise with precise covariance. Therefore, the similarity function $f_x(t)$ is selected to be $f_x(t)=-0.5t$, that is, the similarity between the state and the predicted state is measured by the negative mean squared error. The beam measurement noise of the DVL may be a non-Gaussian noise caused by outliers, and therefore, the similarity function $f_z(t)$ is selected to be $f_z(t)=-\sqrt{(\omega+m)(\omega+t)}$. $\omega$ is the dof parameter, and m is the dimension of measurement, which is 1 in the disclosure.

Step 5: Feedback of the estimated navigation error to the SINS

Through a robust Kalman filter, the estimated misalignment angle $\phi$, velocity error $\delta V^n$ and position error $\delta p$ may be obtained. The attitude matrix, velocity and position solved by pure inertance of the SINS are assumed to be $C_b^{n'}$, $\hat{V}^n$, and $\hat{p}$. Since the strap-down inertial navigation is corrected by feedback correction, the error of the inertial navigation is always kept small, so the feedback correction method of the attitude error is:

$$C_b^n = (I+\phi \times) C_b^{n'} \quad (44).$$

The velocity error $\delta V^n$ and position error $\delta p$ are subtracted directly from the output of the SINS.

$$V^n = \hat{V}^n - \delta V^n, p = \hat{p} - \delta p \quad (45).$$

Figure 3:
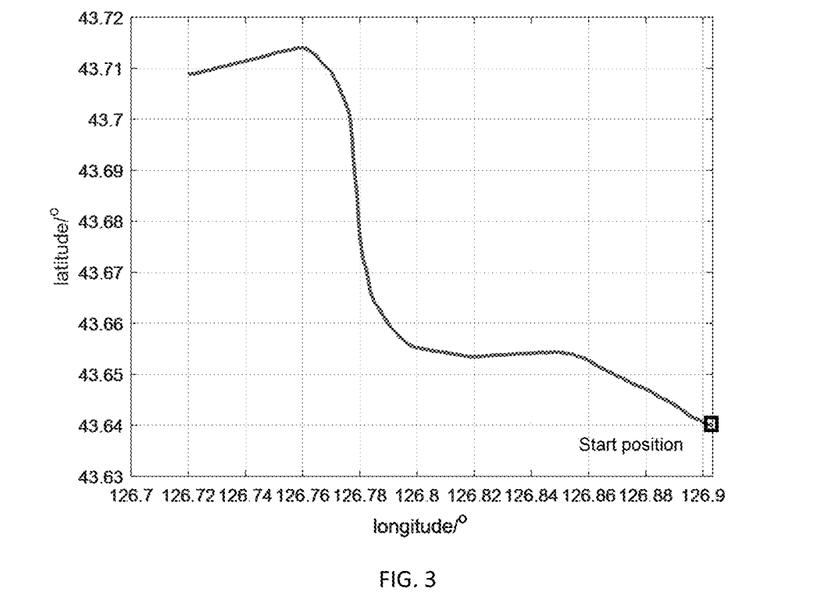
FIG. 3 a diagram showing the experimental trajectory of a lake trial.

Step 6: Verification of the proposed algorithm using experimental data of a lake trial FIG. 3 shows a navigation trajectory of a lake trial. In the experiment, a self-developed strap-down inertial navigation system and DVL are used as devices to be tested, and a GPS receiver and a PHINS inertial navigation system imported from France are used as the benchmark.

Figure 4:
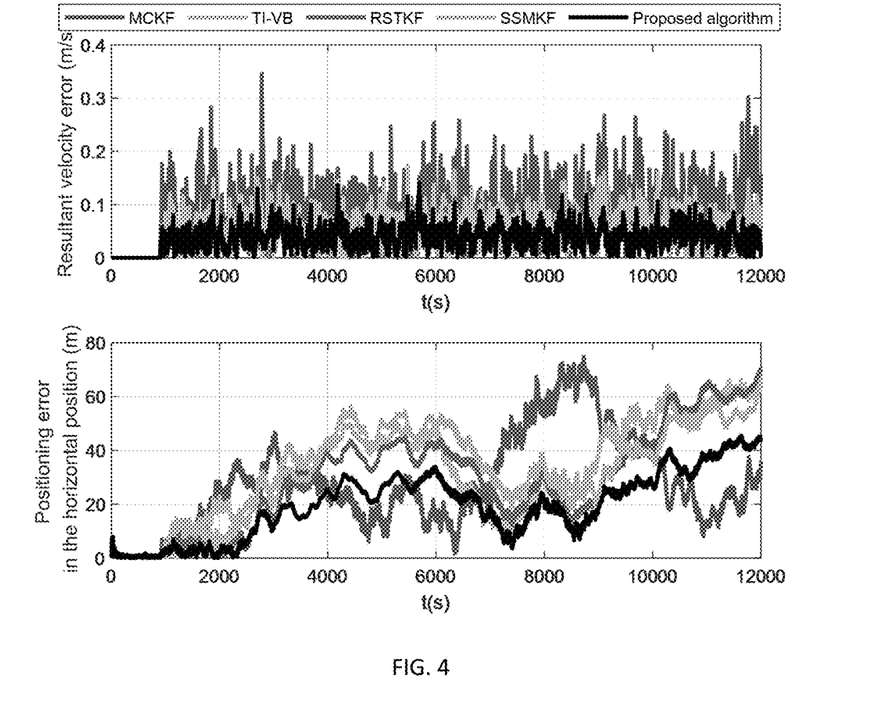
FIG. 4 is a comparison diagram between velocity errors and positioning errors.

FIG. 4 shows the velocity error and horizontal positioning error of the proposed algorithm and the existing robust filtering algorithm applied to the SINS/DVL tightly integrated system. RSTKF represents an existing robust Kalman filter based on Student's t distribution modeling. MCKF represents an existing Kalman filter based on the maximum correntropy criterion. SSMKF represents an existing Kalman filter based on a statistical similarity measure. The biggest difference between the SSMKF and the robust Kalman filter proposed by the disclosure is that SSMKF only uses one auxiliary parameter to uniformly adjust the utilization rate of all measurements, while the robust Kalman filter proposed by the disclosure uses a plurality of auxiliary parameters to adjust the utilization rates of different measurement components respectively. From FIG. 4, it can be seen that both the positioning error and velocity error of the proposed algorithm are the smallest, and the estimation accuracy of the proposed algorithm is obviously higher than that of the SSMKF based on the same statistical similarity measure criterion.

Figure 5:
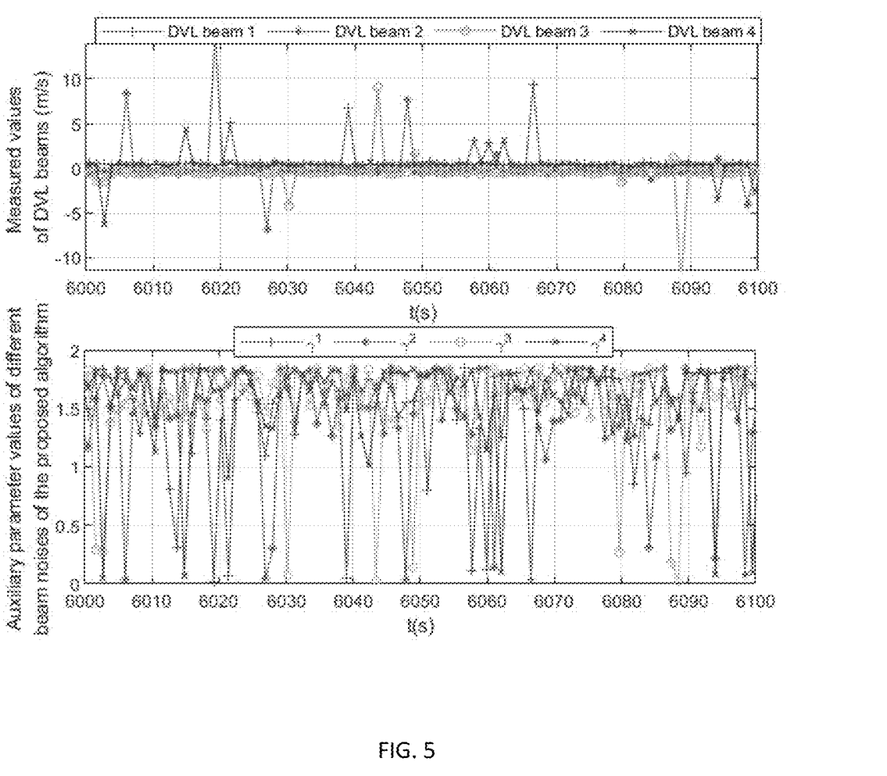
FIG. 5 is a comparison diagram between beam measured values of the DVL and change of auxiliary parameters.
Figure 6:
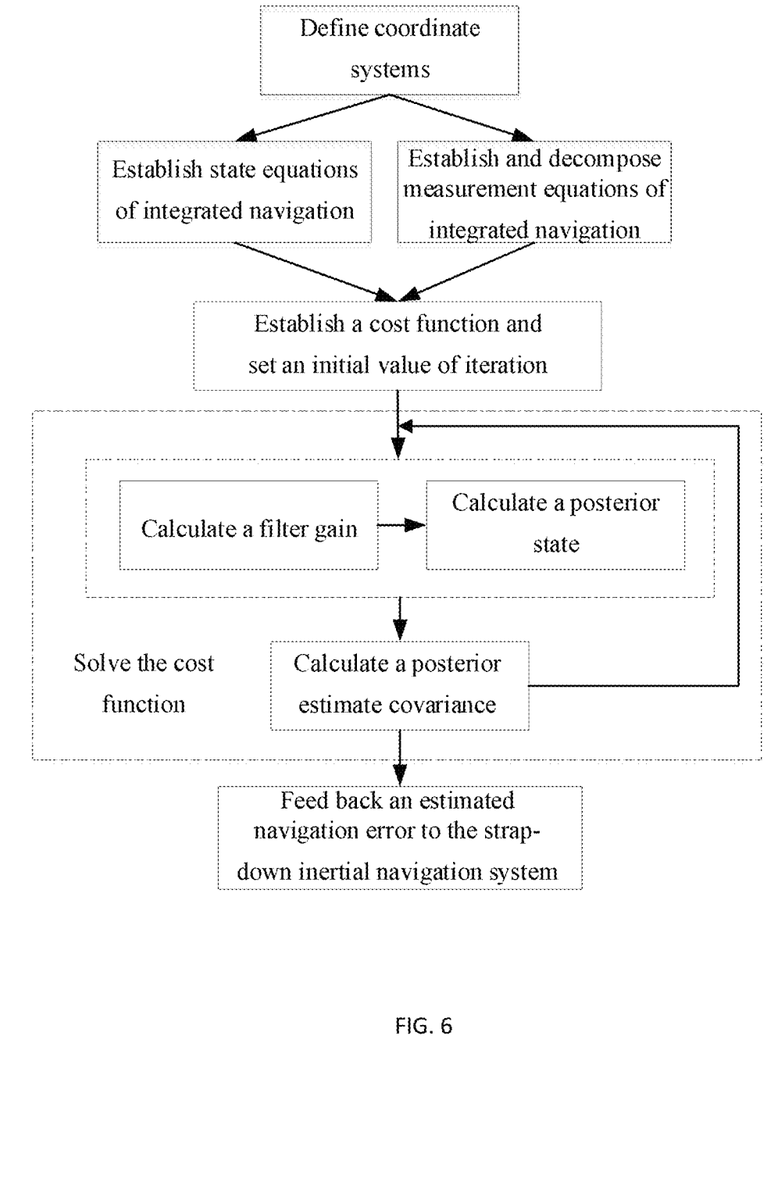
FIG. 6 is a flow chart of implementation of the disclosure.

FIG. 5 shows the changes of the measured value of a DVL beam and the auxiliary parameters corresponding to each beam in the experiment. From the figure, it can be seen that when there are large outliers, the auxiliary parameters corresponding to the DVL beams are significantly reduced, which increases the measurement noise variances of the beams and reduces the proportion of large outliers in the estimation results. However, the auxiliary parameters corresponding to normal DVL beams do not change significantly, so that the proposed algorithm can ensure use of normal measurements while reducing the influence of erroneous measurements.

In view of the situation that there are normal beam measurement information of the DVL and beam measurement information with a large error simultaneously in a SINS/DVL tightly integrated system, and aiming at the problem that the existing robust filters of an integrated navigation system process the measurement information in a rough manner and are likely to lead to loss of normal measurement information, the disclosure proposes a novel robust filtering method based on decomposition of multi-dimensional measurement equations and a statistical similarity measure.

The disclosure introduces the SSM theory while decomposing the multi-dimensional measurement equations of the SINS/DVL tightly integrated navigation system, and assists the measurement noise variance of each beam to complete respective adaptive update in case of a large measurement error, finally ensuring independence of processing of the measurement information of each beam. The disclosure can be used in the field of integrated navigation of underwater vehicles under non-ideal conditions.

The main advantages of the disclosure are as follows:

(1) The disclosure decomposes the measurement equations of a SINS/DVL tightly integrated navigation system, establishes a cost function using the statistical similarity measure concept, and improves the utilization efficiency of normal measurement information by a robust information fusion method of the integrated navigation system in the case of abnormal measurement.

(2) The disclosure iteratively solves the nonlinear cost function, reducing the numerical calculation error.

(3) The disclosure considers the system as a nonlinear system when establishing and solving the cost function, therefore, the robust information fusion method proposed by the disclosure has a broad range of application, and can be used in both linear systems and nonlinear systems.

The above embodiments are merely preferred embodiments of the disclosure and are not intended to limit the disclosure. It will be apparent to those skilled in the art that various modifications and changes may be made in the disclosure. Any modification, equivalent replacement and improvement made within the spirit and principle of the disclosure shall be included within the protection scope of the disclosure.

What is claimed is:

1. A robust filtering method for integrated navigation based on a statistical similarity measure, comprising the following steps:

step 1: defining coordinate systems, comprising the following steps:

defining that a body coordinate system is represented by b, an "earth-centered, earth-fixed" coordinate system is represented by e, an "east-north-up" geographic coordinate system is represented by n as a navigation system, an inertial coordinate system is represented by i, and a DVL coordinate system is represented by d;

defining velocities in different coordinate systems:

$$V_{SINS}^b = [V_x^b \; V_y^b \; V_z^b]^T$$

$$V_{SINS}^n = [V_{SINS\_E}^n \; V_{SINS\_N}^n \; V_{SINS\_U}^n]^T$$

$$V_{SINS}^d = [V_{SINS\_1}^d \; V_{SINS\_2}^d \; V_{SINS\_3}^d \; V_{SINS\_4}^d]^T$$

$$V_{DVL}^d = [V_{DVL\_1}^d \; V_{DVL\_2}^d \; V_{DVL\_3}^d \; V_{DVL\_4}^d]^T$$

wherein $V_{SINS}^b$ represents a velocity vector of a strap-down inertial navigation system in the b-frame; $V_{SINS}^n$ represents a velocity vector of the strap-down inertial navigation system in the n-frame; $V_{SINS}^d$ represents a velocity vector of the strap-down inertial navigation system in the d-frame; and $V_{DVL}^d$ represents a velocity vector of a beam of the DVL in the d-frame;

step 2: establishing state equations of a SINS/DVL tightly integrated navigation system: comprising the following steps:

measuring an output of an accelerometer attached to an underwater vehicle;

selecting errors of the SINS as the states, comprising a misalignment angle $\phi$, a velocity error $\delta V^n$, a position error $\delta p$, a gyro constant drift $\varepsilon^b$ and an accelerometer constant zero bias $\nabla^b$, and establishing state equations as follows:

$$X = [\delta p^T \; \delta V^{nT} \; \phi^T \; \varepsilon^{bT} \; \nabla^{bT}]^T$$

$$\dot{X} = FX + Gw$$

$$w = [w^{bg} \; w^{ba}]^T$$

$$\delta \omega_{ib}^b = \varepsilon^b + w^{bg}$$

$$\delta f^b = \nabla^b + w^{ba}$$

$$\dot{\phi} = -\omega_{in}^n \times \phi + \delta \omega_{in}^n - C_b^n \delta \omega_{ib}^b$$

$$\delta \dot{v}^n = f^b \times \phi + v^n \times (\delta \omega_{ie}^b + \delta \omega_{in}^n) - (\delta \omega_{ie}^b + \delta \omega_{in}^n) \times \delta v^n + C_b^n \delta f^b + \delta g^n$$

$$\delta \dot{p} = M_{pv} \delta v^n + M_{pp} \delta p$$

$$M_{pv} = \begin{bmatrix} 0 & \frac{1}{R_M} & 0 \\ \frac{\sec L}{R_N} & 0 & 0 \\ 0 & 0 & 1 \end{bmatrix}$$

$$M_{pp} = \begin{bmatrix} 0 & 0 & -\frac{v_N}{(R_M)^2} \\ \frac{v_E \sec L \tan L}{R_N} & 0 & -\frac{v_E \sec L}{(R_N)^2} \\ 0 & 0 & 0 \end{bmatrix}$$

wherein $\varepsilon^b$ represents a gyro constant drift vector; $w^{bg}$ is a gyro random drift vector; $\varepsilon^b$ is an accelerometer constant zero bias vector; $w^{ba}$ is an accelerometer random zero bias vector; $\phi$ represents a misalignment angle vector consisting of pitch, roll and yaw misalignment angles; $C_b^n$ is a direction cosine matrix, representing a transformation from the b-frame to the n-frame; $\omega_{in}^n$ represents an angular velocity vector in the b-frame relative to the i-frame under the b-frame, and a corresponding calculation error is $\delta \omega_{in}^n = \delta \omega_{ie}^n + \delta \omega_{en}^n$; $v^n = [v_E \; v_N \; v_h]^T$ is a velocity vector of a body relative to the ground in the n-frame, and a corresponding error vector is $\delta v^n$; $f^b$ is the output of the accelerometer; $\delta g^n$ is a projection of a gravity error vector in the n-frame; $\delta p$ represents a position error vector consisting of a latitude error $\delta L$, a longitude error $\delta \lambda$ and an altitude error $\delta h$; and $R_M$ and $R_N$ respectively represent the radius of curvature of a meridian circle and a prime vertical circle;

step 3: establishing and decomposing measurement equations of the SINS/DVL tightly integrated navigation system, comprising the following steps:

measurement equations:

$$Z = [\hat{V}_{SINS}^d - \hat{V}_{DVL}^d]$$

$$= [C_b^d C_n^b (I_{3\times3} + \phi \times)(V_{INS}^n + \delta V^n) - (V_{DVL}^d + \delta V_{DVL}^d)]$$

$$= [C_b^d C_n^b \delta V^n - C_b^d C_n^b V_{INS}^n \times \phi - \delta V_{DVL}^d]$$

$$Z = HX + v$$

$$H = [0_{4\times3} \; C_b^d C_n^b \; -C_b^d C_n^b V_{SINS}^n \times \; 0_{4\times3} \; 0_{4\times3}]$$

wherein $v = -\delta V_{DVL}^d$ represents a measurement noise; $I_{3\times3}$ is a three-dimensional identity matrix; $[\bullet \times]$ represents a cross product of vectors; $V_{DVL}^d = V_{SINS}^d = C_b^d C_n^b V_{SINS}^n$; $C_b^d = [b_1 \; b_2 \; b_3 \; b_4]^T$;

$$b_i = \begin{bmatrix} \sin\varphi_i \cos\alpha \\ \cos\varphi_i \cos\alpha \\ -\sin\alpha \end{bmatrix}; \varphi_i = (i-1)90° + \varphi_0, \; i = 1, 2, 3, 4;$$

$\alpha$ is a horizontal angle between the beam and the carrier; and $\varphi_0$ is set as 0° or 45°;

wherein measurement noises of various beams of the DVL are usually uncorrelated, and a measurement noise covariance matrix $R = E[vv^T]$ is a diagonal matrix, so the measurement equation is equivalently decomposed:

$$\begin{cases} Z^1 = \hat{V}^d_{INS\_1} - \hat{V}^d_{DVL\_1} = H^1 X + v^1 \\ Z^2 = \hat{V}^d_{INS\_2} - \hat{V}^d_{DVL\_2} = H^2 X + v^2 \\ Z^3 = \hat{V}^d_{INS\_3} - \hat{V}^d_{DVL\_3} = H^3 X + v^3 \\ Z^4 = \hat{V}^d_{INS\_4} - \hat{V}^d_{DVL\_4} = H^4 X + v^4 \\ Z^5 = \hat{h}_{PS} - h_{INS} = H^5 X + v^5 \end{cases}$$

wherein $H^j$ represents the j-th row of a measurement matrix; $v^j$ is the corresponding measurement noise, and the measurement noises of different beams of the DVL are uncorrelated; here, the measured values of four beams of the DVL are assumed to be measured respectively by different sensors;

step 4: establishing a cost function of state estimation based on a statistical similarity measure:

$$(\hat{X}_{k+1/k+1}, \hat{P}_{k+1/k+1}) =$$
$$\operatorname*{argmax}_{(X_{k+1}, P_{k+1})} \left\{ f_x\left(tr\left(A_{k+1}\hat{P}^{-1}_{k+1/k}\right)\right) + \sum_{i=1}^{q} f_z\left(tr\left(B^j_{k+1}(R^j_{k+1})^{-1}\right)\right) \right\} =$$
$$\operatorname*{argmax}_{(X_{k+1}, P_{k+1})} J(X_{k+1}, P_{k+1})$$

$$A_{k+1} = \int (X - \hat{X}_{k+1/k})(X - \hat{X}_{k+1/k})^T N(X; X_{k+1}, P_{k+1}) dX =$$
$$(X - \hat{X}_{k+1/k})(X - \hat{X}_{k+1/k})^T + P_{k+1}$$

$$B^j_{k+1} = \int (Z^j_{k+1} - h^j_{k+1}(X))(Z^j_{k+1} - h^j_{k+1}(X))^T N(X; X_{k+1}, P_{k+1}) dX$$

wherein $\hat{X}_{k+1/k}$ and $\hat{P}_{k+1/k}$ respectively represent a state one-step prediction result and a one-step prediction covariance matrix; $N(X; X_{k+1}, P_{k+1})$ represents a Gaussian distribution about X, a mean is $X_{k+1}$, a variance is $P_{k+1}$; a similarity function $f_x(t)$ is selected as $f_x(t) = -0.5t$; a similarity function $f_z(t)$ is selected as $f_z(t) = -\sqrt{(\omega+m)(\omega+t)}$, $\omega$ is the dof parameter, $\omega$ is the dimension of measurement, m=1; and q=4;

step 5: applying Gauss-Newton iteration to find an optimal value of the cost function, comprising the following steps:

step 5.1: initializing the number of iterations t=0, setting an initial value of iteration as $\hat{X}^0_{k+1/k+1} = \hat{X}_{k+1/k}$, and $\hat{P}^0_{k+1/k+1} = \hat{P}_{k+1/k}$;

step 5.2: calculating a filter gain $K^{j(t)}_{k+1}$;

$$K^{j(t)}_{k+1} = \left( \xi^t_{k+1} \hat{P}^{-1}_{k+1/k} + \sum_{i=1}^{q} \gamma^{j(t)}_{k+1} (H^i_{k+1})^T (R^i_{k+1})^{-1} H^i_{k+1} \right)^{-1} \gamma^{j(t)}_{k+1} (H^j_{k+1})^T (R^j_{k+1})^{-1}$$

wherein $$H^j_{k+1} = \frac{\partial H^j_{k+1}(X_{k+1})}{\partial X_{k+1}} \bigg|_{X_{k+1} = \hat{X}^t_{k+1/k+1}};$$

$\xi^t_{k+1}$ and $\gamma^{i(t)}_{k+1}$ are equivalent to auxiliary parameters used for adjusting the one-step prediction covariance matrix and a measurement noise variance;

step 5.3: calculating a posterior state $\hat{X}^{t+1}_{k+1/k+1}$ $$\hat{X}^{t+1}_{k+1/k+1} = \hat{X}_{k+1/k} + \sum_{j=1}^{q} K^{j(t)}_{k+1}\left(Z^j_{k+1} - h^j_{k+1}(\hat{X}^t_{k+1/k+1}) - H^j_{k+1}(\hat{X}^t_{k+1/k} - \hat{X}^t_{k+1/k+1})\right)$$

step 5.4: calculating an estimated error covariance matrix $\hat{P}^t_{k+1/k+1}$:

$$\hat{P}^t_{k+1/k+1} = \left(I - \sum_{j=1}^{q} K^{j(t)}_{k+1} H^j_{k+1}\right) \hat{P}_{k+1/k} \left(I - \sum_{j=1}^{q} K^{j(t)}_{k+1} H^j_{k+1}\right)^T + \sum_{j=1}^{q} K^{j(t)}_{k+1} R^j_{k+1} (K^{j(t)}_{k+1})^T;$$

and
step 5.5: judging whether $$\frac{\partial J(X_{k+1}, P_{k+1})}{\partial X_{k+1}} \bigg|_{X_{k+1} = \hat{X}^t_{k+1/k+1}, P_{k+1} = \hat{P}^t_{k+1/k+1}} = 0$$

is met; if not, setting t=t+1, returning to step 5.2; otherwise, setting $X_{k+1} = \hat{X}^t_{k+1/k+1}$, $P_{k+1} = \hat{P}^t_{k+1/k+1}$, and outputting an error X of the SINS; and step 6: feeding back the estimated error X of the SINS to the SINS for correction, comprising the following steps:

according to the estimated error X of the SINS, obtaining the misalignment angle $\phi$, the velocity error $\delta V^n$, and the position error $\delta p$, wherein for an attitude matrix $C_b^{n'}$, a velocity $\hat{V}^n$, and a position $\hat{p}$ solved by the SINS, a feedback correction method of attitude errors is:

$C_b^n = (I + \phi \times) C_b^{n'}$; and subtracting the velocity error $\delta V^n$ and the position error $\delta p$ directly from the output of the SINS:

$V^n = \hat{V}^n - \delta V^n$, $p = \hat{p} - \delta p$.

navigating the underwater vehicle based on $V^n$ and P.

* * * * *